J. O. ANTISDALE.
Plant and Tree Protectors.
No. 195,913. Patented Oct. 9, 1877.
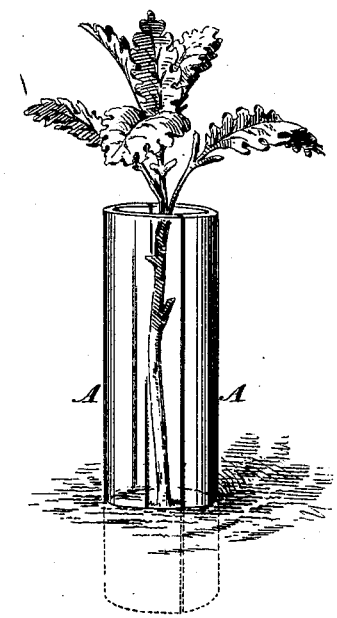
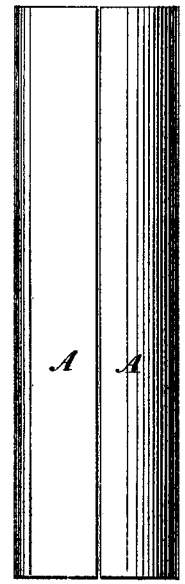
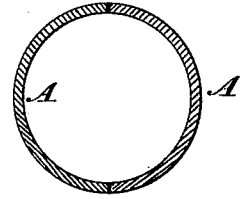
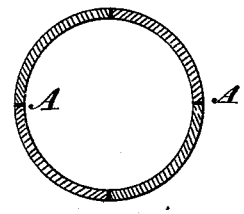
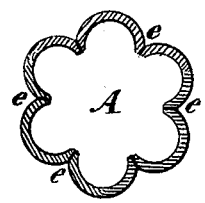
WITNESSES:
Edgar Tate
J. H. Scarborough.
INVENTOR:
J. O. Antisdale.
BY Munn & Co.
ATTORNEYS.

UNITED STATES PATENT OFFICE.

JULIUS O. ANTISDALE, OF LAKE HARBOR, MICHIGAN.

IMPROVEMENT IN PLANT AND TREE PROTECTORS.

Specification forming part of Letters Patent No. 195,913, dated October 9, 1877; application filed June 30, 1877.

*To all whom it may concern:*

Be it known that I, JULIUS O. ANTISDALE, of Lake Harbor, in the county of Muskegon and State of Michigan, have invented a new and Improved Plant and Tree Protector, of which the following is a specification:

The object of my invention is to protect plants and trees from the ravages of worms.

In all sections of the country where the soil is dry it has been impossible to raise full crops on account of the ravages of the "cut-worm," which works at night and eats off the tops of the young shoots. This worm, as well as the worm known as the "borer," also does considerable injury to full-grown plants, and to trees and vines.

Prior to my invention tubes of sheet metal, paper, and other opaque substances have been used for protecting plants against the ravages of worms. These tubes were pressed into the soil around the plants, but it was soon found that the worms would crawl up their sides and destroy the plants. It was also found that plants surrounded by opaque tubes which were not destroyed did not thrive, and were more backward in their growth than those plants which were not provided with the tubes.

In the annexed drawing, Figure 1 is a perspective view, showing a plant surrounded by my improved protector. Fig. 2 is a side view of the protector. Fig. 3 is a horizontal section of the same. Figs. 4 and 5 show a modification.

Similar letters of reference indicate corresponding parts.

The improved protector should be transparent, and for this purpose I prefer to use glass, on account of its cheapness and durability, and because the worms cannot crawl on it. I use a cylinder of glass, six inches, more or less, in length, and of any suitable diameter. This cylinder is composed of two half-sections, A A, which are forced a few inches into the soil, so as to surround the plant. The earth is pressed closely about the cylinder to keep the two sections together without the use of a band.

Instead of forming the protector of two semi-cylindrical sections, I may use quarter-sections, and arrange them as shown in Fig. 5, or they may be arranged as shown in Fig. 4.

The advantage of using sections less than a semi-cylinder is, that any number of them can be nicely fitted together and a protector formed of any desired diameter.

I construct the protector in longitudinal sections for the purpose of removing it at any time when the tree, plant, or vine has attained such size that it is out of danger of the worm.

To guard against the worm known as the "borer," I surround the base of the tree with a protector, as above described, and apply, between it and the tree, raw cotton or some other light substance. This will prevent the "miller" from laying her eggs inside of the protector.

I am able by my invention not only to prevent plants from being destroyed by worms, but I am also able to force plants, for the reason that they are protected from winds and frost, and receive light, heat, and moisture.

Having thus described my invention, I claim as new and desire to secure by Letters Patent—

A plant-protector consisting of a glass tube in two or more longitudinal sections, as shown and described.

JULIUS O. ANTISDALE.

Witnesses:
   C. C. CHAMBERLAIN,
   CHAS. F. LATIMER.